United States Patent

[11] 3,625,363

[72] Inventor John Eberle
2027 28th Ave. S.W., Calgary, Alberta, Canada
[21] Appl. No. 14,486
[22] Filed Feb. 26, 1970
[45] Patented Dec. 7, 1971
[32] Priority Feb. 27, 1969
[33] Japan
[31] 44/14967

[54] SPIN-ON TYPE FILTERS
11 Claims, 4 Drawing Figs.
[52] U.S. Cl. ................................................. 210/130,
210/134, 210/136, 210/441, 210/493, 210/494
[51] Int. Cl. ........................................................B01d 35/14,
B01d 27/10
[50] Field of Search........................................ 210/130,
134, 136, 441, 442, 443, 494, DIG. 17

[56] References Cited
UNITED STATES PATENTS
3,085,688  4/1963  Eberle..........................  210/232
1,165,640  12/1915 Utz et al. .....................  210/130
3,256,989  6/1966  Hultgren .....................  210/130

Primary Examiner—Frank A. Spear, Jr.
Attorney—Kent & Ade

ABSTRACT: A replaceable filter which includes an outer perforated canister and an inner star-shaped, perforated canister around which is woven a plurality of layers of nonwoven relatively open-pored filter material. A relief valve surrounds the inner stem in the form of a resilient washer which lets oil bypass the filter without dumping dirt or oil back into the oil stream.

PATENTED DEC 7 1971

3,625,363

INVENTOR
JOHN EBERLE

BY *Kent & Ide*

ATTORNEY

SPIN-ON TYPE FILTERS

This invention relates to new and useful improvements in spin-on-type filters for oil systems of automotive or truck engines and the like.

Conventionally, this type of filter is screw threadably engageable over an oil conduit and, when replaced, is removed and disposed of. This conventional type of filter suffers from several disadvantages.

Firstly, it is difficult to engage the filter casing with a wrench or the like due to the lack of space where such filters are usually installed.

Secondly, it is relatively expensive to replace an entire filter and element thus adding to the cost of maintenance.

Thirdly, all such filters include a bypass valve which enables oil to bypass the filter and pass directly to the bearings in case the filter element is clogged or when the oil is cold and relatively thick. Conventional filters with such bypass valves, are constructed so that the oil bypassing the filter picks up dirt upon the filtering media and dumps same into the main engine oil supply thus destroying the usefulness and effect of the filter element.

The present invention overcomes all of these disadvantages as will hereinafter be described and in particular provides a filter which has a replaceable element thus reducing the maintenance cost considerably.

Another object of the invention is to provide a device of the character herewith described in which the bypass valve prevents "dumping" from occurring.

A yet further object of the invention is to provide a device of the character herewith described in which the filtering element is enclosed within an outer and inner casing thus preventing collapse of the filtering media due to oil pressure, sludge and the like.

A yet further object of the invention is to provide a device of the character herewith described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

In the drawings, like characters of reference indicate corresponding parts in the different Figures.

Figure 1:
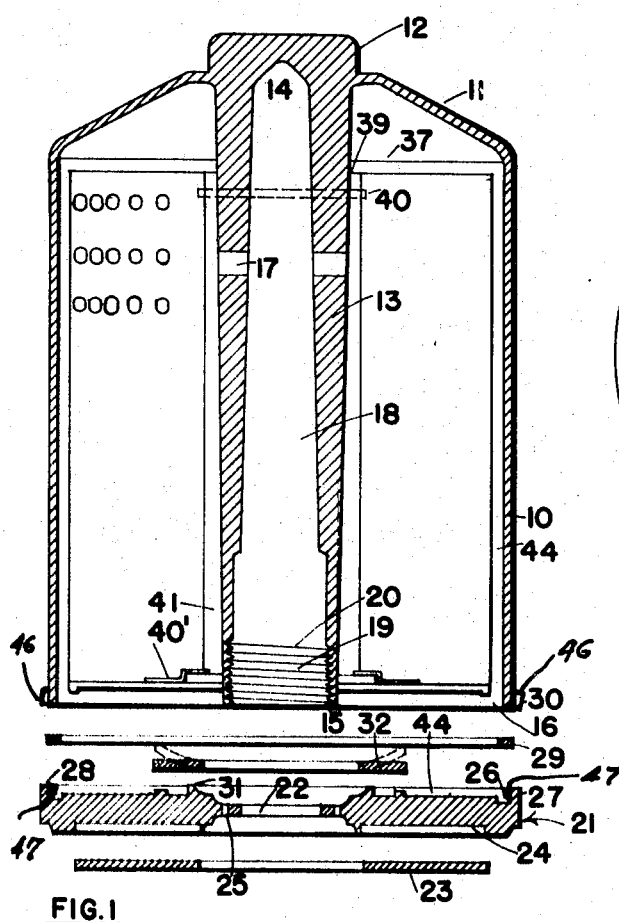
FIG. 1 is a sectional exploded view of my filter assembly.

Proceeding therefore to describe the invention in detail, I have found it preferable to form the filter assembly from diecast aluminum or the like although it will be understood, of course, other materials may be used.

Reference character 10 illustrates a substantially cylindrical outer casing having domed upper end 11 closing off the casing and terminating in a hexagonal nut 12 formed integrally upon the domed upper end 11 and concentrically therewith.

Also formed integrally with the casing is a concentrically located hollow spindle 13 also closed at the upper end 14 thereof and open at the base 15 as is the casing at the base 16.

This spindle is provided with oil apertures 17 through the walls thereof to the interior bore 18, said apertures being situated intermediate the ends of the spindle but towards the upper end 14 thereof.

The lower end 19 of the spindle is internally screw threaded as at 20 to engage over the conventional oil conduit (not illustrated), normally present on automotive engines.

This conduit feeds oil from the filter to the engine bearings in the usual way.

A base cap collectively designated 21 is provided detachably engageable over the lower open end 16 of the casing 10, said base cap having a centrally located aperture 22 engageable over the oil conduit which communicates with the lower end 19 of the spindle as hereinbefore described.

A resilient sealing washer 23 is seated around the underside 24 of the cap and engages the area around the oil conduit thus sealing the oil conduit effectively.

Situated outboard of the central aperture 22 is a plurality of oil intake apertures 25 through which oil is pumped from the engine pump to an area surrounding the oil conduit. This construction is conventional and therefore has not been illustrated.

An annular channel 26 is formed just inboard of the perimeter 27 of the cap upon the upper side 28 thereof and a resilient sealing washer 29 is seated within this channel. The lower end 30 of the end wall of the casing 10 seats within this channel upon the sealing washer thus assisting in the location of the cap upon the casing and also giving an effective seal around this area. Due to the cap engaging over the end 30, any increase in oil pressure increases the sealing capacity of the seal rather than weakening same as happens in conventional seals.

An annular bead 31 is formed also on the upper surface 28 of the cap just outboard of the oil intake apertures 25 and a nonreturn valve in the form of a plain resilient washer 32 seats upon this bead approximately in the position shown in FIG. 1.

The internal bore of this washer is slightly smaller than the bead 31 so that the washer has to be stretched slightly to engage the bead. This causes the outer portion of the washer to act as a nonreturn valve. This action is shown in dotted line in FIG. 1.

Figure 4:
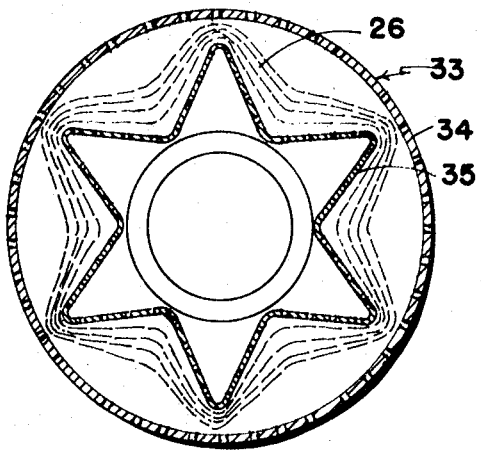
FIG. 4 is a horizontal sectional view of the filter element per se.

Reference should next be made to FIGS. 1 and 4 in which reference character 33 illustrates generally the filter element. This consists of a perforated outer cylindrical casing 34 and a perforated inner casing 35, the inner casing being formed substantially star-shaped when viewed in plan as shown in FIG. 4. This increases the effectiveness of the contact area of the filter media 36 situated between the outer and inner casing 34 and 35. This filtering media can be any well known material but is preferably a very porous, nonwoven rayon material in a plurality of layers wound around the inner casing which is then inserted within the outer casing. The upper and lower ends of this casing are sealed by end caps 37 and 38 respectively, said end caps being centrally apertured as at 39 to engage over the aforementioned spindle 13 when the device is assembled.

Figure 2:
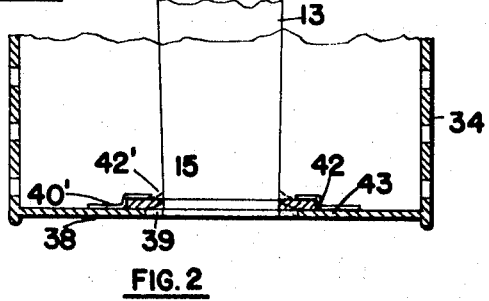
FIG. 2 is a fragmentary view of the lower end of the filter element showing the bypass valve.

A rubber washer 40 is secured to the underside of the upper cap 37 by a metal cap 40' and surrounds the spindle thus sealing same. It will be noted that the spindle tapers inasmuch as the diameter of the lower end 15 is less than the upper end thus leaving an annular space 41 adjacent the lower end between the spindle and the wall of the cap 38. A bypass nonreturn valve 42 is provided and comprises a planar resilient washer held in place with a metal cap 40' upon the inner surface 43 of the lower cap 38 surrounding the aperture 39 and overlapping as clearly shown in FIG. 2. This washer embraces the lower end 15 of the spindle and normally prevents oil from passing thereby.

Referring back to FIG. 1, the nonreturn valve 32 is situated between the base 38 of the filter element and the annular ring 31 on the cap 21. Oil entering apertures 25 deflects this valve or washer away from the base 38 thus enabling oil to pass to the annular channel 44 between the filter element and the casing wall 10. Oil flows upwardly around the filter element, through the apertures or perforations within the outer casing 34 of the element, through the filtering media 36 and thence through the inner canister 35 of the filtering media to the area 41 surrounding the spindle 13. It then flows through the oil apertures 17 to the interior 18 of the spindle and thence downwardly to the oil conduit (not illustrated).

When the filter media is clogged or the oil is cold and thus relatively thick, the space provided by the nonreturn valve 32 is not sufficient for the oil to pass through and therefore in order to avoid starving the engine bearings of oil the aforementioned bypass valve 42 is provided. As soon as the pressure builds to a predetermined figure, the overlapping portion of this washer deflects upwardly as shown in phantom by reference character 42' in FIG. 2 thus enabling oil to pass directly to the annular space 41 and thence through the oil aperture 17 to the interior of the spindle 18.

Figure 3:
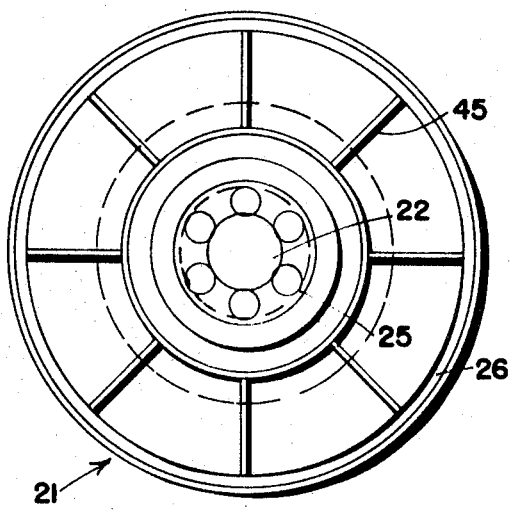
FIG. 3 is a top plan view of the base cap per se.

The principle advantage of this construction is that any dirt not entrapped within the filter media, rests in the annular recess 44 formed in the upper surface of the cap 28 and between the stiffening ribs 45 as shown in FIG. 3, and this dirt is not washed by the bypassing oil as it is is in conventional spin-on-type filters.

Another advantage is the fact that this construction of nonreturn valve cannot jam in the open position. Conventional valves often jam open thus causing oil to bypass the filter indefinitely thus negating any advantages the filter may offer.

To replace the filter element it is merely necessary to engage a wrench over the hexagonal nut portion 12, remove the filter assembly from the oil conduit, withdraw the element 33 and replace it with a new one and then replace the entire assembly on the oil conduit, an operation that takes only a few minutes and is therefore economical to perform.

Reference should be made to the star-shaped inner casing 35 of the element. This configuration gives a considerable increase in oil escape area. Conventionally the inner bore is just a relatively small cylinder so that the ratio of the area of the outer casing to the inner casing is relatively large. This may cause considerable back pressure particularly if the filter contains any amount of sludge.

Referring back to the nonreturn valve in the form of washer 32, this is of particular use when the filter is lying horizontally. However, when the filter is situated at an angle or vertically, it is not necessary to utilize the nonreturn valve washer 32. Reference should be made to FIG. 1 in which it will be seen that the depth of the filter element is slightly less than the depth of the casing 10 so that the filter element is capable of slight upward and downward movement relative to the case.

When in the vertical or diagonal position, the weight of the filter element will ensure that the base of the element registers upon the annular bead 31 thus sealing off effectively until pressure of oil lifts the filter element upwardly slightly and permits oil to pass thereby.

When the filter is assembled of course, the screw threading engagement of the filter assembly with the engine block clamps the bottom lid assembly 21 firmly to the casing 10. However, in placing or when offering up the filter element for assembly to the engine, it is necessary to hold the lid on frictionally and I have provided a plurality of friction holding pads 46 around the outer lower perimeter of the casing 10 frictionally engageable by a plurality of similar holding pads 47 situated on the wall of the annular groove 26. When the portion 21 is entered over the lower side of the casing, a slight rotation will cause the pads 46 and 47 to come into interference thus giving frictional holding while the filter assembly is being offered to the engine block.

As mentioned above, the construction of the filter portion of the unit is made with a multilayered, very porous nonwoven rayon cloth. Since the pores in the various layers of cloth do not fall in line with one another, they cause a diversion in the flow of the oil as it passes through the layers. This action causes the impurities to become entrapped between the layers of cloth.

One very important feature gained by the use of this construction and material is the fact that it provides a simple but accurate method for increasing or decreasing the density to suit any particular requirement. This is accomplished by adding or reducing the layers of cloth within the filter element and is particularly useful where a requirement calls for removal of the specified micron-sized particles. The aforementioned star-shaped core 35 not only supplies a large escape area and results in a very free-flowing unit but also acts as a support for the filter element.

It has been noted that a pleated "paper" type filter has a large escape area. However, tests indicate that the oil pressure pushing on the outside of the pleat pinches it together at the root diameter, thereby giving it very little more escape area than the tubular metal support inside the paper filter. The star-shaped core 35 prevents this pinching and supports the element at all times.

Needless to say the outer metal sleeve 34 and the inner star-shaped support 35 are well provided with governed openings to ensure equal flow distribution throughout the entire area of the filter. The perforations of the inner support 35 are so located to prevent any migration of fibers.

Various modificatons can be made within the scope of the inventive concept which is herein disclosed and/or claimed.

What I claim as my invention is:

1. A spin-on-type filter for oil systems of automotive engines and the like comprising in combination an outer cylindrical casing open at the base thereof, a hollow spindle formed integrally with said casing and extending concentrically from the closed end internally to the open end, said spindle being open at the lower end thereof and having oil entrance ports through the wall thereof and intermediate the ends thereof, the lower end of said spindle being internally screw threaded to engage over the conventional oil conduit, a base cap sealably engageable over said lower end of said cylindrical casing, an oil conduit aperture situated centrally of said cap, oil intake apertures in said cap concentrically surrounding said oil conduit aperture, a replaceable oil filter element in said casing surrounding said spindle, nonreturn valve means between said oil intake apertures and the outer surface of said filter element, and nonreturn bypass valve means surrounding said spindle between said spindle and the inner bore of said filter element.

2. The device according to claim 1 in which said nonreturn valve means comprises a resilient planar gasket surrounding said oil intake apertures and cooperating between said cap and the base of said filter element.

3. The device according to claim 2 in which the sealing engagement of said base cap includes a concentrically situated annular channel formed in said cap adjacent the perimeter thereof, and a resilient washer in said channel, said lower end of said casing seating in said channel and engaging said washer.

4. The device according to claim 2 in which said bypass nonreturn valve means comprises a resilient gland secured to said inner bore of said filter element at the base thereof and engaging snugly around said spindle whereby pressure on the underside of the gland moves same upwardly and away from said spindle.

5. The device according to claim 4 in which the sealing engagement of said base cap includes a concentrically situated annular channel formed in said cap adjacent the perimeter thereof, and a resilient washer in said channel, said lower end of said casing seating in said channel and engaging said washer.

6. The device according to claim 4 in which said filter element includes an outer perforated canister and an inner perforated canister, upper and lower end caps apertured to engage said spindle, and filtering media between said canisters, said inner perforated canister, when viewed in plan, being substantially star-shaped to increase the contact area of said filter media and escape area of oil flow.

7. The device according to claim 1 in which said bypass nonreturn valve means comprises a resilient gland secured to said inner bore of said filter element at the base thereof and engaging snugly around said spindle whereby pressure on the underside of said gland moves same upwardly and away from said spindle.

8. The device according to claim 7 in which the sealing engagement of said base cap includes a concentrically situated annular channel formed in said cap adjacent the perimeter thereof, and a resilient washer in said channel, said lower end of said casing seating in said channel and engaging said washer.

9. The device according to claim 8 in which said filter element includes an outer perforated canister and an inner perforated canister, upper and lower end caps apertured to engage said spindle, and filtering media between said canisters, said inner perforated canister, when viewed in plan, being substantially star-shaped to increase the contact area of said filter media and escape area of oil flow.

10. The device according to claim 1 in which the sealing engagement of said base cap includes a concentrically situated annular channel formed in said cap adjacent the perimeter thereof, and a resilient washer in said channel, said lower end of said casing seating in said channel and engaging said washer.

11. The device according to claim 1 in which said filter element includes an outer perforated canister and an inner perforated canister, upper and lower end caps apertured to engage said spindle, and filtering media between said canisters, said inner perforated canister, when viewed in plan, being substantially star-shaped to increase the contact area of said filter media and escape area of oil flow.

* * * * *